Jan. 20, 1959

F. E. BROOKS 2,870,373

DEFLECTION SYSTEMS

Filed Feb. 13, 1956

INVENTOR.
FORREST E. BROOKS
BY
ATTORNEY

United States Patent Office 2,870,373

Patented Jan. 20, 1959

2,870,373

DEFLECTION SYSTEMS

Forrest Edward Brooks, Fort Washington, Pa., assignor to Radio Corporation of America, a corporation of Delaware Application February 13, 1956, Serial No. 565,128

7 Claims. (Cl. 315—27)

Figure 1:
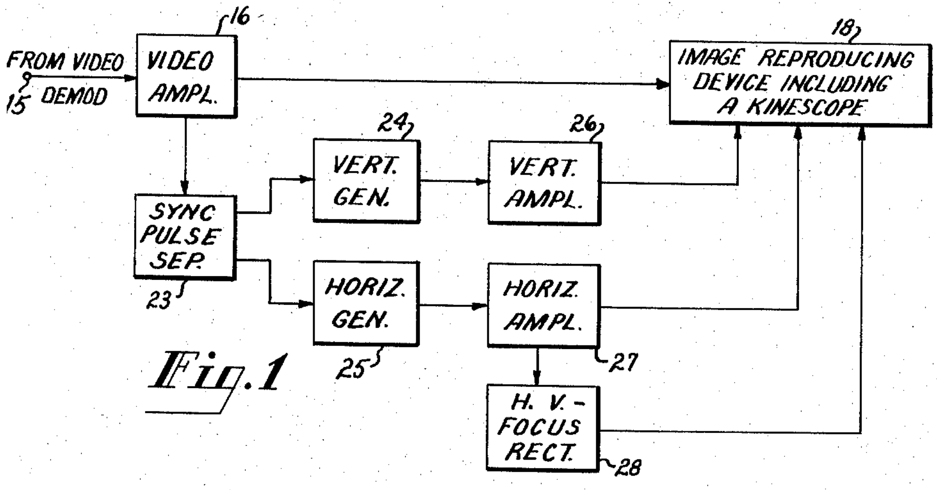

The invention relates to circuitry for applying deflection current waves to the electromagnetic electron beam deflecting windings arranged about the electron beam path within a cathode ray tube to deflect the beam, and it particularly pertains to such circuitry incorporating means for centering the raster formed by the deflection of the electron beam and for substantially improving the linearity of such deflection.

In present television practice, for example, an image is formed on the flourescent screen of a cathode ray image reproducing device, or kinescope, by intensity modulating an electron beam in accordance with image information signals to vary the light point-by-point over a raster which is formed by deflecting the electron beam in directions normal with respect to each other. Sawtooth deflection current waves, generated in appropriate circuits in the television receiver, are applied to the electron beam deflecting windings which are mounted in a mechanical yoke arranged about the neck of the kinescope.

In television receivers where no component is provided to adjust the linearity of the horizontal deflection, the center of the raster is nearer to one side of the screen because of an inherent stretch on that one side of the reproduced image and compression on the other side. In present day television receivers using electrostatic focus kinescopes, centering may be accomplished by using a centering magnet located immediately to the rear of the deflection system windings. Likewise, with magnetically focused kinescopes, centering may be accomplished by movement of the focused magnet or a portion thereof. In large kinescopes having a wide angle of deflection, the beam centering function must be performed at a location on the neck of the kinescope nearer to the flared portion to prevent neck shadow. Neck shadow is the mechanical interference with the beam by the neck of the kinescope at the corners or sides of the scanning raster. With such kinescopes in which the beam is deflected by electromagnetic means centering of the raster may be most economically accomplished by controlled flow of direct current in the deflection system windings.

In addition to the problem of centering the raster produced by beam deflection, there is the problem of insuring that the deflection is linear with respect to time. There are two forms of linear distortion. One form is non-symmetrical and may be corrected by proper design of deflection windings and damping circuitry. The other form is symmetrical and is proportional to the angle of deflection. This symmetrical form is inherent in a television kinescope where the center of curvature of the tube differs from the center of beam deflection.

There are remedies known in the art for correcting the symmetrical form of linearity distortion. One good remedy for the horizontal circuit is to select the value of the energizing potential boosting capacitor to provide a flattening of the sawtooth wave of current flowing in the beam deflecting winding and thereby compress the edges of the horizontal scan.

This correcting effect of course increases as the capacitance decreases. For kinescopes wherein the maximum angle of deflection is greater than 90°, the value of the boosting capacitor must be reduced to a value at which circuit efficiency is so reduced as to be impractical. The desired degree of linearity may also be obtained by connecting a capacitor in series with the beam deflection windings as set forth in U. S. Patent 2,817,788 issued on December 24, 1957 on application Serial No. 469,682, filed on November 18, 1954 by V. D. Landon and A. W. Vance. However, electric current centering may not then be used.

An object of the invention is to simplify the deflection circuitry of television receivers and to reduce the cost accordingly.

Another object of the invention is to provide improved means for introducing centering current in a deflection system winding which is coupled in series with a capacitor arranged to provide a desired degree of linearity of deflection.

A further object of the invention is to provide an improved circuit arrangement for obtaining centering current from the normal direct current flow in a television receiver and thereby eliminate the necessity for a separate direct current source.

According to the invention, both electric centering and the desired linearity correction are afforded in a simplified and straight forward circuit arrangement. A deflection wave output transformer is arranged with two winding portions through which the direct current for energizing the associated deflection wave amplifying tube flows to produce the desired deflection voltage pulses across the winding portions. A resistance element is interposed in series circuit relationship between the two winding portions and is given a value at which there appears, due to the normal direct current flow, a potential drop of the proper value to cause the desired centering current to flow through the deflection winding associated with the kinescope. The deflection winding is connected for direct current flow across a series circuit comprising this resistance element and one of the winding portions, by means preferably including an adjustable inductance element enabling variation of the amplitude of beam deflecting current flowing through the beam deflecting winding. The desired linearity is obtained by coupling the beam deflecting winding only for alternating current to at least a part of the one winding portion by means of a capacitor having a capacitance at which in conjunction with the inductance of the beam deflecting winding there is formed a circuit series resonant at a frequency substantially below the frequency corresponding to the deflection rate. In many cases this series circuit is resonated at a frequency between one-third and one-fourth of the frequency corresponding to the deflection rate. This series circuit serves to lower the impedance in the anode circuit of the output tube, increase the beam deflecting current flowing in the beam deflecting winding, and to impart a cosine shaping to the beam deflecting current waveform, all of which tend to improve the performance of a given circuit.

Figure 2:
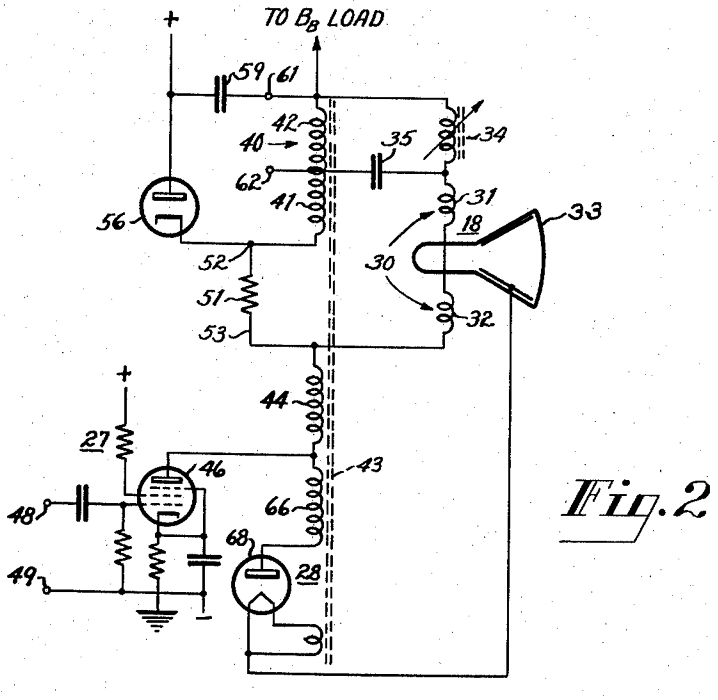

In order that the invention may be more fully appreciated and advantages thereof readily obtained in practice, a specific circuit arrangement, given by way of example only, is described with reference to the accompanying drawing, in which:

Fig. 1 is a functional diagram of portions of a television receiver which may incorporate circuitry according to the invention; and Fig. 2 is a schematic diagram of a television receiver kinescope deflection circuit arrangement according to the invention.

Fig. 1 shows the functional relationship between portions of a television receiver, of which some portions may be entirely conventional while others may incorporate circuitry according to the invention. In a television receiver having such portions, television signals appearing at an antenna are applied to a radio frequency (R.-F.) amplifying circuit and the output therefrom is applied along with a wave from a local oscillation generating circuit to a frequency converting circuit. The output of the frequency converting circuit is applied to an intermediate frequency (I.-F.) circuit which may be an individual picture I.-F. amplifying circuit or one amplifying both picture and sound I.-F. signals. A video demodulating circuit is coupled to the picture I.-F. amplifying circuit for deriving the composite video wave from the television signals. The detected composite video wave is applied at input terminals 15 to a video frequency (V.-F.) amplifying circuit 16. The image information bearing portions of the composite video wave are applied, through the intermediary of luminance and chrominance signal handling circuitry in the case of a color television receiver, to the input circuit of an image reproducing device 18 of the type including an electromagnetic deflection type of cathode ray tube, or kinescope. Sound signals may be derived from one of the foregoing circuits in known manner and further processed in known circuitry for driving a sound reproducing device, usually a speaker.

The output composite video wave is also applied to a synchronizing pulse separating circuit 23 to separate the synchronizing pulses from the image information and to separate the vertical synchronizing pulses from the horizontal synchronizing pulses. The vertical synchronizing pulses are applied to a vertical deflection wave generating circuit 24, and the horizontal synchronizing pulses are applied to a horizontal deflection wave generating circuit 25. The vertical and horizontal deflection waves are applied to vertical and horizontal deflection wave amplifying circuits 26 and 27 for producing alternating current electron beam deflecting waves for application to the components forming a part of the deflection system of the image reproducing device 18. An automatic gain control (A.-G.-C.) voltage amplifying and distributing network may be coupled to the V.-F. amplifying circuit 16 or the synchronizing pulse separating circuit 23. The A.-G.-C. network may be gated by a pulse wave obtained from the horizontal deflection wave amplifying circuit 27 to supply control potential to the desired ones of the circuits previously mentioned. Usually the R.-F. and I.-F. amplifying circuits at least are so supplied. A high voltage and/or focus voltage rectifying circuit 28 is coupled to the horizontal deflection wave amplifying circuit 27 to supply ultor and/or focus potentials to the kinescope of the image reproducing device 18. A low voltage power supply, usually in the form of a rectifier operating from an alternating current (A.-C.) power line, is arranged to supply direct energizing potential to the horizontal and vertical deflection wave amplifying circuits 26, 27 and all other circuits requiring direct potential energization.

Either or both of the deflection wave amplifying circuits 26, 27 may incorporate the improved linearity controlling and raster centering circuit arrangement according to the invention.

Fig. 2 is a schematic diagram of an example of linearity controlling and raster centering arrangement embodying the invention and employed in the horizontal deflection circuit of a television receiver. A beam deflecting winding 30, conventionally comprising two sections 31 and 32, either connected in parallel or in series as shown, is a part of the image reproducing device 18 and is arranged in a mechanical yoke for deflecting the electron beam of a kinescope 33, also forming a part of the image reproducing device 18. The deflecting winding sections 31, 32 are traversed by an alternating deflection current wave obtained by means including an inductance element 34 connecting one terminal of one deflecting winding section 31 to one terminal of a winding portion 40 of a horizontal output transformer. The other terminal of the winding portion 40 is connected by direct current (D.-C.) carrying means to the end terminal of the other deflecting winding section 32 to complete a D.-C. circuit. A coupling capacitor 35 is connected between the junction of the one deflection winding 31 and the inductance element 34 and an intermediate tap on the winding portion 40, dividing this portion of the winding into two sections 41 and 42. It should be understood, however, that the entire winding portion 40 constitutes the output winding of the transformer and that the alternating current wave is developed across the entire winding portion. It is convenient, however, to design the output winding of any deflection transformer to provide more than sufficient deflecting energy and to employ a variable inductor in order to provide some adjustment of the amplitude of the horizontal deflection wave, or width of the raster, to accommodate the existing A.-C. power line voltage level and to provide some adjustment as the tubes in the television receiver lose efficiency with age. The coupling capacitor 35 is connected at a point on the output transformer winding at which the impedance substantially matches the impedance of the deflection system winding 30, so that it is convenient, although perhaps not strictly correct, to consider the one section 41 as an impedance matching section and the other section 42 as a width controlling section. The linearity of deflection is controlled by varying the capacitance of the coupling capacitor 35. For kinescopes having angular deflection in excess of 90° and a center of curvature of the face plate differing widely from the center of deflection of the electron beam, the value of the coupling and deflection linearity correcting capacitor 35 should be such as to resonate the series circuit comprising the linearity controlling capacitor 35 and the deflection winding 30 at a frequency substantially below one-half and preferably between one-third and one-fourth of the deflection frequency. The resonant frequency should increase in proportion to the deflection angle. With a kinescope having a maximum deflection angle of 110° the desired linearity of deflection over the screen of the kinescope was obtained with series resonance at a frequency of the order of 4 kc. for a deflection frequency of 15.75 kc. The alternating current (A.-C.) wave is induced in the tapped winding portion 40 by inductive coupling, which may include a core 43 of magnetic material, to another winding portion 44. Alternating potential may be impressed across the energizing winding portion 44, for example, by means of an electron discharge device shown as a beam-power pentode amplifying tube 46. A sawtooth deflection wave is applied between the control grid and cathode of the amplifying tube 46 at the input terminals 48, 49 to produce the desired output wave.

Direct current (D.-C.) for centering the electron beam deflection is obtained by diverting current flow from a circuit in the television receiver in which direct current is normally flowing. This is readily accomplished, according to the invention, by connecting a resistance element 51 between the winding portions 40 and 44 and applying direct energizing potential to the circuit in such manner as to bring the end terminal 52 of the resistance element 51 to a potential positive with respect to the potential at the other end terminal 53. As shown, the connections may be made through the cathode-to-anode path of the electron discharge device 46 and through the cathode-to-anode path of another electron discharge device, shown as a damping tube 56. Although the A.-C. and D.-C. currents required are obtained from the same circuit in the example given, it should be clearly understood that, according to the invention, the electron discharge devices 46 and 56 may be clearly disassociated with the deflecting system in so far as A.-C. operation is involved, these devices being merely suggested means for obtaining the D.-C. centering current. The centering resistance element 51 may be adjustable, so that the centering may be varied from time to time, however, it is contemplated that a fixed centering current will be sufficient and that the value of the resistance element 51 may be set within adequate tolerances for a given television receiver chassis.

A capacitor 59 connected between the anode of the damping tube 56 and the A.-C. reference potential point of the winding portion 40 completes a known energizing potential boosting circuit for increasing the anode of the horizontal deflection wave amplifying tube 46 to approximately twice the value supplied by the low voltage power supply. The lowermost terminal 53 of the centering resistor 51 is returned to the point of reference potential, shown as ground, through the primary portion 44 of the winding and the anode-to-cathode path of the pentode tube 46. As shown, the energizing potential boosting capacitor 59 is connected to the terminal 61 at the junction between the inductance element 34 and the width controlling winding section 42. With this connection, the junction between the deflection winding section 31 and the linearity correcting capacitor 35 is at a relatively high A.-C. potential due to the impedance of the width controlling inductance element 34. If this condition is found undesirable, the potential boosting capacitor 59 may be connected to the tap on the winding 40 at the terminal 62 with only a slight decrease in amplitude of the derived deflection wave. Furthermore, instead of connecting the width controlling inductance element 34 in shunt with the width controlling winding 42 of the transformer as shown, a series connection may be used wherein the width controlling inductance element 34 is connected in parallel with the linearity controlling capacitor 35 to the potential boosting capacitor 59.

Thus with the circuit arrangement shown, the center portion of the raster is expanded by the use of the linearity correcting capacitor 35 while at the same time D.-C. is arranged to flow through the deflection system winding 30 to center the deflection, with a minimum number of components. It should be understood that the circuit arrangement according to the invention does not operate with impaired efficiency but, on the contrary, provides improved circuit performance by increasing the scan and lowering the effective anode impedance presented to the amplifier tube.

A conventional high voltage winding 66 may be arranged on the transformer core 43 and connected between the anode of the pentode tube 46 and the anode electrode of a high voltage rectifying device 68. High voltage fly-back pulses appearing in the high voltage winding 66 are applied by the rectifying device 68 to maintain the ultor of the kinescope 70 above reference potential, shown as ground, at a steady high voltage level.

A substantial improvement in operation was obtained with a receiver designed for monochrome television image reproduction modified along the lines shown in Fig. 2 and using the pertinent component parts values as listed below.

| Ref. No. | Component | Type or Value |
|---|---|---|
| 30, 31, 32 | Horizontal beam deflecting winding | 20 mh. |
| 33 | Kinescope | C73830. |
| 35 | Horizontal linearity correcting capacitor | .07 mf. |
| 46 | Horizontal deflection wave amplifying tube. | 6DQ6. |
| 51 | Horizontal centering resistor | 33 ohms. |
| 56 | Damping tube | 6AX4. |
| 59 | Potential boosting capacitor | 0.047 mf. |
| 74 | Width adjusting inductor | 3-16 mh. |

The low voltage power supply developed approximately 350 volts between the points marked with the plus (+) sign and the point of reference potential, shown as ground.

The invention claimed is:

1. A deflection system for deflecting the electron beam of a cathode ray television image reproducing tube comprising a beam deflecting winding associated with said tube, a direct current energized deflection wave translating device, a deflection wave output transformer comprising one winding portion having one terminal connected to said deflection wave translating device and having another winding portion, a resistance element interconnecting said winding portions, means to pass energizing direct current through said resistance element, said one winding portion and said translating device, means to connect said beam deflecting winding across said resistance element and said other winding portion for direct current flow, and means including a capacitor connecting said beam deflecting winding across at least a part of said other winding portion of said transformer for alternating current flow, said capacitor having a capacitance at which in conjunction with the inductance of said beam deflecting winding there is formed a circuit resonant at a frequency substantially below the frequency of the translated deflecting wave.

2. A deflection system for deflecting the electron beam of a cathode ray television image reproducing tube comprising a beam deflecting winding associated with said tube, a direct current energized deflection wave translating device, a deflection wave output transformer comprising one winding portion having one terminal connected to said deflection wave translating device and having another winding portion, a resistance element interconnecting said winding portions, means to pass energizing direct current through said resistance element, said one winding portion and said translating device, means including an inductance element to connect said beam deflecting winding across said resistance element and said other winding portion for direct current flow, and means including a capacitor connecting said beam deflecting winding across at least a part of said other winding portion of said transformer for alternating current flow, said capacitor having a capacitance at which in conjunction with the inductance of said beam deflecting winding there is formed a circuit resonant at a frequency substantially below the frequency of the translated deflecting wave.

3. A deflection system for deflecting the electron beam of a cathode ray television image reproducing tube comprising a beam deflecting winding associated with said tube, a deflection wave amplifying tube having cathode, control and anode electrodes, means to apply a sawtooth wave of given deflection rate between the control and cathode electrodes of said amplifying tube, a deflection wave output transformer having an output winding portion and an energizing winding portion having one terminal connected to the anode electrode of said amplifying tube, a resistance element having one terminal connected to the other terminal of said energizing winding portion, means to apply direct energizing potential between the other terminal of said resistance element and the cathode electrode of said amplifying tube, means connecting said output winding portion to said other terminal of said resistance element, means including an amplitude controlling inductance element connecting said beam deflection winding for direct current flow across the series circuit comprising said resistance element and said output winding portion, and means including a capacitor resonant with said beam deflecting winding at a frequency below the deflecting wave frequency connecting said beam deflecting winding across said resistance element and at least part of said output winding portion for alternating current flow.

4. A deflection system for deflecting the electron beam of a cathode ray television image reproducing tube comprising a beam deflecting winding associated with said tube, a deflection wave amplifying tube having cathode, control and anode electrodes, means to apply a sawtooth wave of given deflection rate between the control and cathode electrodes of said amplifying tube, a deflection wave output transformer having an output winding portion and an energizing winding portion having one terminal connected to the anode electrode of said amplifying tube, a resistance element having one terminal connected to the other terminal of said energizing winding portion, means to apply direct energizing potential between the other terminal of said resistance element and the cathode electrode of said amplifying tube, means connecting said output winding portion to said other terminal of said resistance element, means including an amplitude controlling inductance element connecting said beam deflection winding for direct current flow across the series circuit comprising said resistance element and said output winding portion, and means including a capacitor connecting said beam deflecting winding across said resistance element and at least part of said output winding portion for alternating current flow, said coupling capacitor having a value of capacitance at which in conjunction with the inductance of said beam deflecting winding the angular deflection of the electron beam in said kinescope is greater at the center of the raster than at the edges.

5. A deflection system for deflecting the electron beam of a cathode ray television image reproducing tube comprising a beam deflecting winding associated with said tube, a horizontal deflection wave amplifying tube having cathode, control and anode electrodes, means to apply a sawtooth wave of horizontal deflection rate between the control and cathode electrodes of said amplifying tube, a deflection wave output transformer having an output matching winding portion, a width controlling winding portion, and an energizing winding portion having one terminal connected to the anode electrode of said amplifying tube, a resistance element having one terminal connected to the other terminal of said energizing winding portion, a damping tube having a cathode connected to the other terminal of said resistance element and having an anode, means to apply direct energizing potential between the anode of said damping tube and the cathode electrode of said amplifying tube, means connecting said matching winding portion and said width controlling winding portion in series aiding relationship with each other and said energizing winding portion at said other terminal of said resistance element, an energizing potential boosting capacitor connected between one terminal of said width controlling winding portion and the anode of said damping tube, means including a coupling capacitor connecting said beam deflecting winding across said resistance element and said matching winding portion for alternating current flow, and a width controlling inductance element connected for direct current flow between said beam deflection winding across the series circuit comprising said resistance element and said width controlling winding portion.

6. A deflection system for deflecting the electron beam of a cathode ray television image reproducing tube comprising a beam deflecting winding associated with said tube, a horizontal deflection wave amplifying tube having cathode, control and anode electrodes, means to apply a sawtooth wave of horizontal deflection rate between the control and cathode electrodes of said amplifying tube, a deflection wave output transformer having an output matching winding portion, a width controlling winding portion, and an energizing winding portion having one terminal connected to the anode electrode of said amplifying tube, a resistance element having one terminal connected to the other terminal of said energizing winding portion, a damping tube having a cathode connected to the other terminal of said resistance element and having an anode, means to apply direct energizing potential between the anode of said damping tube and the cathode electrode of said amplifying tube, means connecting said matching winding portion and said width controlling winding portion in series aiding relationship with each other and said energizing winding portion at said other terminal of said resistance element, an energizing potential boosting capacitor connected between one terminal of said width controlling winding portion and the anode of said damping tube, means including a coupling capacitor connecting said beam deflecting winding across said resistance element and said matching winding portion for alternating current flow, said coupling capacitor having a value of capacitance at which in conjunction with the inductance of said beam deflecting winding there is formed a circuit resonant at a frequency substantially below half of the frequency of the horizontal deflection wave, and a width controlling inductance element connected for direct current flow between said beam deflection winding across the series circuit comprising said resistance element and said width controlling winding portion.

7. A deflection system for deflecting the electron beam of a cathode ray television image reproducing tube comprising a beam deflecting winding associated with said tube, a horizontal deflection wave amplifying tube having cathode, control and anode electrodes, means to apply a sawtooth wave of horizontal deflection rate between the control and cathode electrodes of said amplifying tube, a deflection wave output transformer having an output matching winding portion, a width controlling winding portion and an energizing winding portion having one terminal connected to the anode electrode of said amplifying tube, a resistance element having one terminal connected to the other terminal of said energizing winding portion, a damping tube having a cathode connected to the other terminal of said resistance element and having an anode, means to apply direct energizing potential between the anode of said damping tube and the cathode electrode of said amplifying tube, means connecting said matching winding portion and said width controlling winding portion in series aiding relationship with each other and with said energizing winding portion at said other terminal of said resistance element, an energizing potential boosting capacitor connected between the anode of said damping tube and the terminal of said width controlling winding portion remote from the junction of that winding portion with the matching winding portions, means including a width controlling inductance element connecting said beam deflection winding for direct current flow across the series circuit comprising said resistance element and said matching and width controlling winding portions, and means including a coupling capacitor connecting said beam deflecting winding across said resistance element and said matching winding portion for alternating current flow, said coupling capacitor having a value of capacitance at which in conjunction with the inductance of said beam deflecting winding there is formed a circuit resonant at a frequency substantially between one-third and one-fourth of the frequency of the horizontal deflection wave.

References Cited in the file of this patent

UNITED STATES PATENTS 2,505,732 Duke ---------------- Apr. 25, 1950
2,644,103 Fyler ---------------- June 30, 1953